April 20, 1926.
J. HOFMANN
LOAD DETERMINING MEANS
Filed May 23, 1923
1,581,211
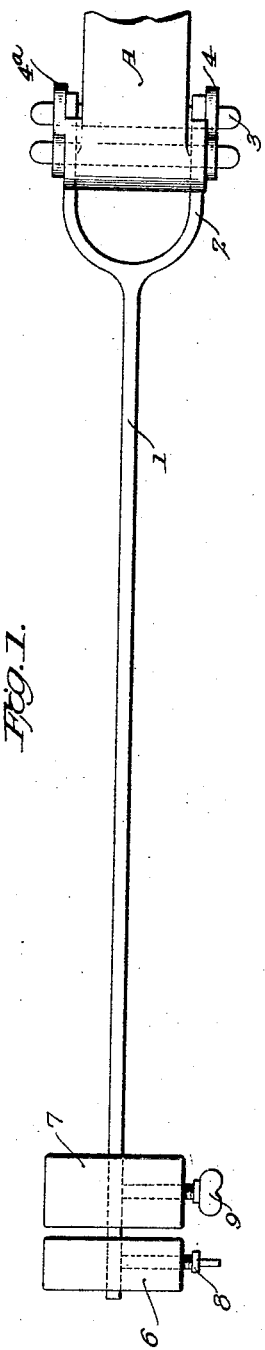
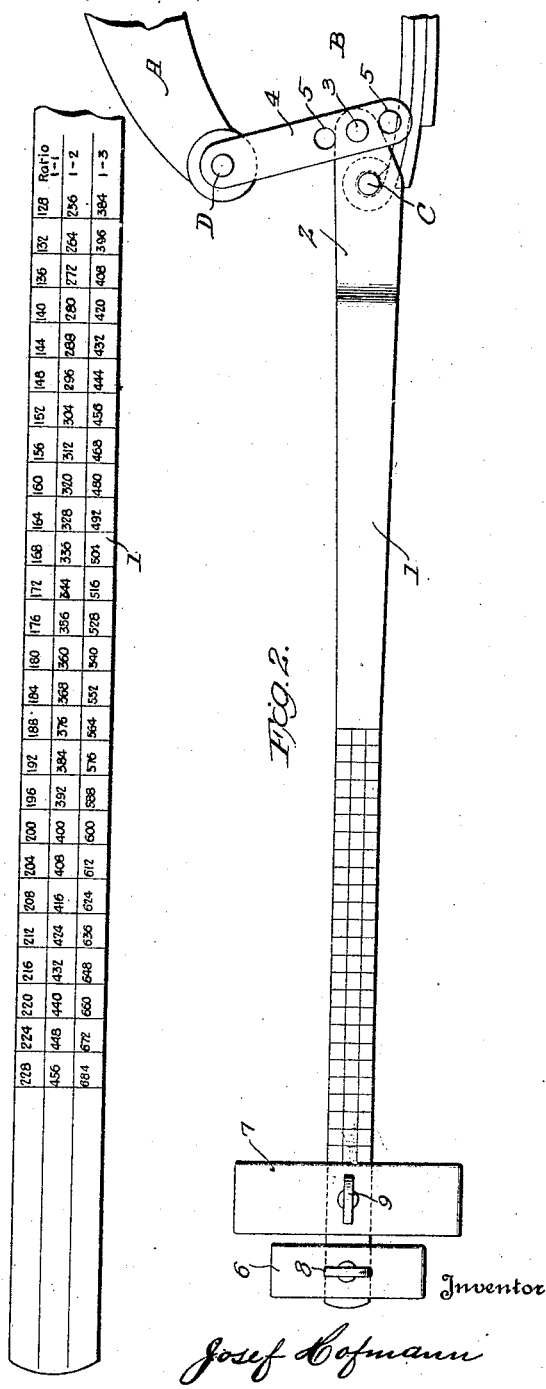
Inventor
Josef Hofmann
By Henry Orth Jr
Attorney Patented Apr. 20, 1926.

1,581,211

UNITED STATES PATENT OFFICE.

JOSEF HOFMANN, OF BAUMAROCHE, SWITZERLAND.

LOAD-DETERMINING MEANS.

Application filed May 23, 1923. Serial No. 640,900.

*To all whom it may concern:*

Be it known that I, JOSEF HOFMANN, a citizen of Poland, residing at Baumaroche, Switzerland, have invented certain new and useful Improvements in Load-Determining Means; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention comprises means to determine the load between the two points of a vehicle between which a shock absorber or auxiliary spring is to be included.

At present, so far as I am aware, there is no device to determine these loads between the points of connection of shock absorbers, and, as a consequence, shock absorbers are included between a running gear element and the vehicle body or body frame extension, regardless of whether the shock absorber is adjusted to or adequate for the loads to be compensated.

In most automobiles the two points to be considered are the body spring eye and the body frame extension, although there are constructions where a shock absorber or auxiliary spring is to be included between other pairs of points, one on the body frame and the other on a running gear part, to which my invention is equally applicable.

After determining the load the shock absorber or auxiliary spring will be chosen or adjusted in accordance with the load indicated by my invention.

I have chosen to illustrate my invention as used with the more usual type of vehicle, where a shock absorber is intended to be placed between the body spring eye of the running gear and the body frame extension of an elliptic spring suspension.

Referring to the drawings, in which like parts are similarly designated—

Figure 1 is a plan view of my invention applied to a vehicle.

Fig. 2 is an elevation, and

Fig. 3 is an enlarged view showing the graduations on the scale beam.

The shackle connecting the body frame extension A with the semi-elliptic spring of the running gear is removed, as it is between the eyes of these two vehicle parts that the shock absorber or auxiliary spring is to be included.

On the bolt or on a suitable pin in one of these eyes, for example on the bolt C of the the spring on the running gear, I place the forked end 2 of a scale beam 1, which forked end extends beyond the pivot bolt C and has holes for the reception of and forms a shorter lever arm that has a removable pin 3. The pivot C therefore lies between the ends of the beam.

On the bolt D, or on a suitable pin in the other eye, in the body frame extension, I mount a shackle 4—4ᵃ consisting of a pair of plates, each having a perforation in one end for the bolt D, and several spaced perforations 5 in the other end for the bolt 3. These perforations 5 are to adjust the bolt 3 to different distances from the bolt D to fit different sizes and makes of vehicles, whose shackles are of different lengths.

On the end of the scale beam and its longer arm I preferably place a stationary weight 6, and in addition have a sliding weight 7, slidable along the beam over a scale indicating in pounds the load, over and above that of the stationary weight 6, which stationary weight represents the minimum resistance for a shock absorber to be included between the two eyes, or the resistance for one of the springs of such a shock absorber.

The stationary weight may be omitted and the entire determination be made with the sliding weight 7. These weights are provided with thumb screws 8 and 9 to hold them in position on the scale beam.

The longer arm of the scale beam 1 is provided with several scales graduated for different types of shock absorbers whose lever arms are pivoted together and the ratio of whose load arms to lever arms varies in different ratios, for example, in the ratios of 1 to 1, or 1 to 2 or 1 to 3, according to the type of shock absorber or auxiliary spring device intended to be used.

The ratio 1 to 1 will of course give the direct load between the two eyes in pounds, the other ratios give direct readings in pounds for the strength of spring to be used with the particular type of absorber selected.

Other ratios may be given for special types of shock absorbers, and both sides, or only one side of the scale beam may have like or different graduations.

I claim—

1. A device for determining the load between the two points of attachment of a shock absorber or an auxiliary spring to a vehicle, which comprises a weighing beam fulcrumed between its ends at one of said points, thereby constituting a lever of the first class, a shackle for connecting the shorter arm of said beam and the other point, and a weight on the longer arm of said beam.

2. A device for determining the load between the two points of attachment of a shock absorber or an auxiliary spring to a vehicle, which comprises a weighing beam fulcrumed between its ends at one of said points thereby constituting a lever of the first class, a shackle for connecting the shorter arm of said beam and said other point, and a shiftable weight on the longer arm of said beam.

3. A device for determining the load between the two points of attachment of a shock absorber or an auxiliary spring to a vehicle, which comprises a weighing beam fulcrumed between its ends at one of said points, thereby constituting a lever of the first class, an adjustable shackle for connecting the shorter arm of said beam and said other point, and a weight on the longer arm of said beam.

4. A device for determining the load between the two points of attachment of a shock absorber or an auxiliary spring to a vehicle, which comprises a weighing beam, fulcrumed between its ends at one of said points, thereby constituting a lever of the first class, a shackle connected to the shorter arm of said beam and adapted to be connected to said other point, and a shiftable and a stationary weight on the longer arm of said beam.

5. A device for determining the load between the two points of attachment of a shock absorber or an auxiliary spring to a vehicle, which comprises a weighing beam fulcrumed between its ends at one of said points, thereby constituting a lever of the first class, a shackle connected to the shorter arm of said beam and adapted to be connected to said other point, and a slidable weight on the longer arm of said beam, said longer arm having a scale graduated according to leverage ratio of the shock absorber or auxiliary spring.

6. A device for determining the load between the two points of attachment of a shock absorber or an auxiliary spring to a vehicle, which comprises a weighing beam having a fork at one end, and fulcrumed between its end at one of said points, thereby constituting a lever of the first class, a shackle connected to the forked portion beyond its pivot and adapted to be connected to said other point, and a weight slidable on said beam.

7. A device for determining the load between the points of attachment of a shock absorber or an auxiliary spring to a vehicle; which comprises a weighing beam having a scale arm and a shorter forked arm having perforations therein, a pivot bolt passing through said perforations by which the beam is pivoted to one of said points, a shackle connecting the forked portion beyond its pivot and said other point, and a weight slidable on said beam.

8. A device for determining the load to be carried by a member adapted to connect two co-operating supports of a vehicle, comprising a weighing beam adapted to be fulcrumed between its ends on one of said supports, thereby constituting a lever of the first class, a shackle pivotally connected to the weight arm of said lever and adapted to be connected to the other support, and a weight adjustably mounted on the power arm of said lever.

9. A device for determining the load to be carried by a member for connecting together the frame of a vehicle and a spring of the latter, comprising a lever having a fulcrum pin between its ends for connection to said spring, and forming a short weight arm and a long power arm, a shackle pivotally connected at one end to said short arm and adapted to be pivotally connected at its other end to said frame extension, and a weight adjustably mounted on the long arm of the lever for counterbalancing the load supported by said short arm.

In testimony that I claim the foregoing as my invention, I have signed my name hereto.

JOSEF HOFMANN.